(12) United States Patent
Ghosh et al.

(10) Patent No.: US 10,880,190 B2
(45) Date of Patent: Dec. 29, 2020

(54) METHOD AND DEVICE FOR PROVISIONING COLLECTIVE PERCEPTION IN COMMUNICATION NETWORKS

(71) Applicant: WIPRO LIMITED, Bangalore (IN)

(72) Inventors: Sudipta Ghosh, Newtown (IN); Swaminathan Seetharaman, Chromepet (IN)

(73) Assignee: Wipro Limited, Bangalore (IN)

( * ) Notice: Subject to any disclaimer, the term of this patent is extended or adjusted under 35 U.S.C. 154(b) by 157 days.

(21) Appl. No.: 16/048,885

(22) Filed: Jul. 30, 2018

(65) Prior Publication Data
US 2019/0386896 A1 Dec. 19, 2019

(30) Foreign Application Priority Data
Jun. 14, 2018 (IN) .............................. 201841022347

(51) Int. Cl.
*H04L 12/24* (2006.01)
*H04L 12/26* (2006.01)
(Continued)

(52) U.S. Cl.
CPC .......... *H04L 43/04* (2013.01); *H04L 43/0823* (2013.01); *H04L 63/20* (2013.01); *H04L 67/12* (2013.01)

(58) Field of Classification Search
CPC ..... H04L 43/04; H04L 43/0823; H04L 63/20; H04L 67/12; H04L 67/14
(Continued)

(56) References Cited

U.S. PATENT DOCUMENTS

2016/0006815 A1* 1/2016 Dong ........................ G06F 9/46
 709/204
2018/0242178 A1* 8/2018 Barton .................. H04W 24/08
(Continued)

OTHER PUBLICATIONS

Handte, M., "Generic Adaptive Middleware for Behavior-driven Autonomous Services (GAMBAS) Consortium, Privacy Preservation Specification 1", Public deliverable D3.1.1, 2012. http://www.gambas-ict.eu/download/D3.1.1-Privacy-Preservation-Specification-1.pdf?attredirects=0&d=1, 32 pages.
(Continued)

*Primary Examiner* — Moustafa M Meky
*Assistant Examiner* — Elizabeth Kassa
(74) *Attorney, Agent, or Firm* — Finnegan, Henderson, Farabow, Garrett & Dunner, LLP

(57) ABSTRACT

A method and device for provisioning collective perception in a communication network is disclosed. The method includes receiving a perception data from a plurality of communication entities in the communication network upon satisfaction of at least one of predefined criteria. The method further includes assimilating the perception data in a global collective experience record table, based on at least one perception data category associated with the predefined criteria. The method includes processing the perception data associated with each of the at least one perception data category to create composite perception information based on entries in the global collective experience record table. The method further includes determining perception distribution information to be shared with at least one communication entity from the plurality of communication entities, based on the composite perception information. The method includes transmitting the perception distribution information to the at least one communication entity, in response to determining.

18 Claims, 6 Drawing Sheets

(51) Int. Cl.
  *H04L 29/06* (2006.01)
  *H04L 29/08* (2006.01)
(58) Field of Classification Search
  USPC .......................................................... 709/224
  See application file for complete search history.

(56) References Cited

U.S. PATENT DOCUMENTS

| | | | | |
|---|---|---|---|---|
| 2019/0132205 A1* | 5/2019 | Du | ......................... | H04L 41/069 |
| 2019/0364492 A1* | 11/2019 | Azizi | .................... | H04W 24/08 |
| 2020/0042372 A1* | 2/2020 | Grant | .................. | G06F 11/0709 |

OTHER PUBLICATIONS

Li, X., et al, "Research on the Architecture of Trusted Security System Based on the Internet of Things", Fourth International Conference on Intelligent Computation Technology and Automation, IEEE 2011. pp. 1172-1175.

Mahmoud, R., et al., "Internet of Things (IoT) Security: Current Status, Challenges and Prospective Measures", The 10th International Conference for Internet Technology and Secured Transactions, 2015. 6 pages.

Neisse, R., et al., "Dynamic Context-Aware Scalable and Trust-based IoT Security, Privacy Framework", Book chapter in Internet of Things—From Research and Innovation to Market Deployment, IERC Cluster Book, 2015. pp. 199-224.

\* cited by examiner

METHOD AND DEVICE FOR PROVISIONING COLLECTIVE PERCEPTION IN COMMUNICATION NETWORKS

TECHNICAL FIELD

This disclosure relates generally to communication networks and more particularly to method and device for provisioning collective perception in communication networks.

BACKGROUND

In case of Internet of Things (IoT) communications, the privacy and security needs change dynamically depending on the context or purpose, during an engagement (session) as well as across engagements. One of the conventional systems proposes a mechanism of dynamic, adaptive and composite privacy and security mechanism for IoT communication. It proposes to form and dynamically adapt the perception pre-engagement and engagement phase based on global and local perception inputs. The communication filters during pre-engagement and engagement phase are then adapted dynamically based on the updated perception. It however fails to describe how the global perception, which is a collection of perception inputs across multiple IoT sessions involving multiple IoT networks is assimilated. Further, this conventional system does not describe how the global perception inputs are distributed other than mentioning that it will done upon request from InterConnect Gateway (ICG) or upon receiving a notification of a security/privacy related exception.

Another conventional system presents an IoT security architecture which addresses security needs at different places in an IoT network as well as across the various protocol layers and functions. It proposes a Trusted Network Module (TSM) which handles security incident management, risk management and security strategy configuration management. The TSM is mainly responsible for the accreditation of network users, the collection and distribution of security management information such as users' authorization, and the audit and control of related security issues. However, this conventional system fails to address how security incidents enable refinement of security settings for future IoT communication involving the same users/devices in the same context or in a different context, as well as similar communication involving a different set of users/devices. Further, this conventional system only addresses security aspects, and not privacy or other aspects of IoT communication.

Yet another conventional system discusses about the current status, challenges and prospective measures of IoT security. It proposes a trust establishment mechanism, such that, access control is provided based on the device and the current owner by an entitlement system. As owners of the device change, the access control levels also change. This conventional system also proposes access-control delegation. However, this conventional system fails to address the dynamic change in needs of access for a particular device depending on the context and the purpose of communication, the communicating entities and correspondingly addressing this need by taking also into consideration past transactions involving the communicating entities. Additionally, this conventional system only addresses security aspects, and not privacy or other aspects of IoT communication.

Another conventional system proposes a policy-based privacy mechanism in which the privacy policy generator automatically picks up policies or privacy settings that are pre-specified by the user in a social network or collaboration tool, and creates a compatible privacy policy. The generator includes tools to resolve conflicting settings and is able to generalize data types. It also allows the user to manually fine-tune the privacy policy. However, this mechanism does not focus on the security aspects, and also does not address the dynamic changes in privacy and security requirements during the course of an IoT interaction.

Yet another conventional system proposes a context-aware and trust-based security and privacy framework in which security policies are implemented as ECA rules. However, the proposed framework does not dynamically adapt to changes in context, trust-level, environment, etc. during the interaction. The framework will also encounter limitations when faced with new/unknown service-oriented and inter-IoT interaction scenarios without any human intervention.

The above discussed conventional systems have one or more of the following limitations: Failure to provide effective security/privacy for functional (purpose and context driven) communication, failure to provide dynamic and need-based device agnostic privacy and security in communication beyond access control, failure to provide mechanism of collective-experience-based-communication (assimilating past experiences across IoT networks and communications sharing the collective relevant experience with relevant IoT devices and networks, and enabling its appropriate use for future IoT communication) based on the nature (context and purpose) and communicating entities.

SUMMARY

In one embodiment, a method for provisioning collective perception in a communication network is disclosed. The method includes receiving, by a network device, a perception data from a plurality of communication entities in the communication network upon satisfaction of at least one of predefined criteria. The method further includes assimilating, by the network device, the perception data in a global collective experience record table in response to receiving the perception data from the plurality of communication entities, based on at least one perception data category associated with the predefined criteria. The method includes processing, by the network device, the perception data associated with each of the at least one perception data category to create composite perception information for each of the at least one perception data category based on entries in the global collective experience record table, wherein the perception data is processed based on the associated perception data category. The method further includes determining, by the network device, perception distribution information to be shared with at least one communication entity from the plurality of communication entities, based on the composite perception information created for each of the at least one perception data category. The method includes transmitting, by the network device, the perception distribution information to the at least one communication entity, in response to determining.

In another embodiment, a network device for provisioning collective perception in a communication network is disclosed. The network device includes a processor and a memory storing processor instructions that, when executed by the processor, cause the processor to receive a perception data from a plurality of communication entities in the communication network upon satisfaction of at least one of predefined criteria. The processor instructions further cause the processor to assimilate the perception data in a global collective experience record table in response to receiving the perception data from the plurality of communication entities, based on at least one perception data category associated with the predefined criteria. The processor instructions further cause the processor to process the perception data associated with each of the at least one perception data category to create composite perception information for each of the at least one perception data category based on entries in the global collective experience record table, wherein the perception data is processed based on the associated perception data category. The processor instructions further cause the processor to determine perception distribution information to be shared with at least one communication entity from the plurality of communication entities, based on the composite perception information created for each of the at least one perception data category. The processor instructions further cause the processor to transmit the perception distribution information to the at least one communication entity, in response to determining.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
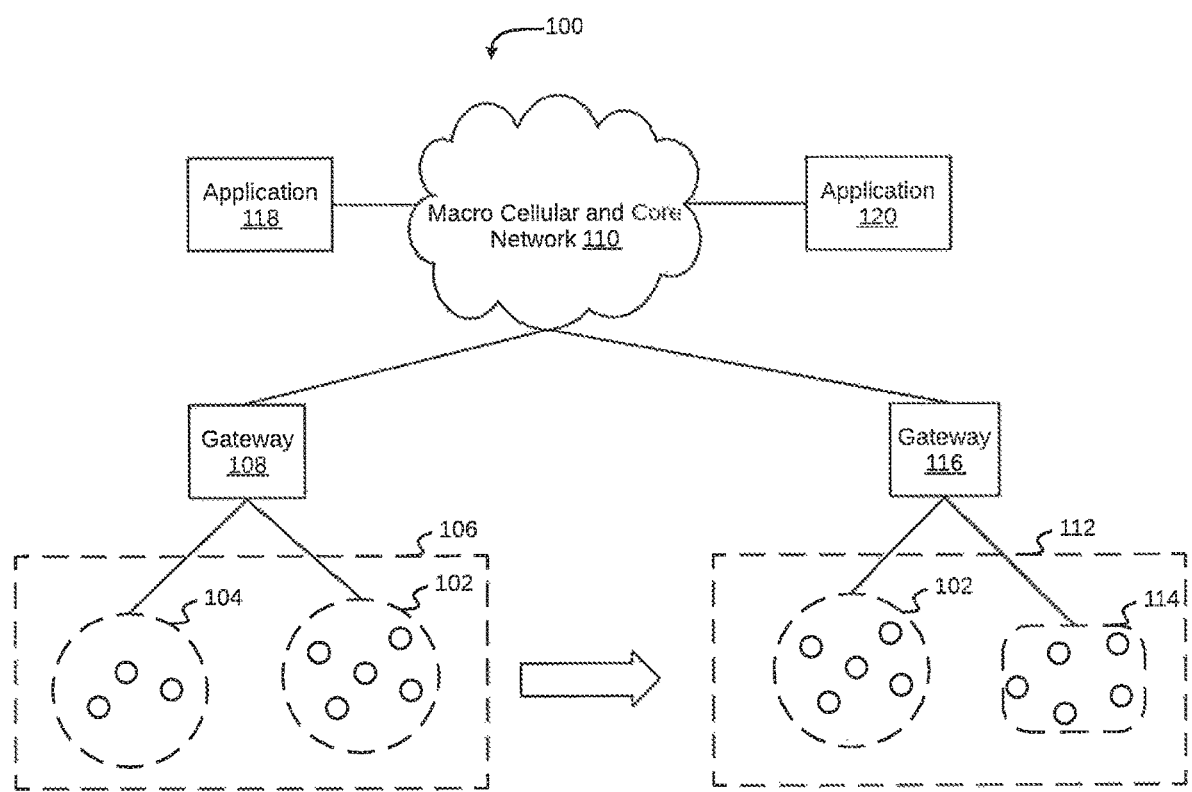
FIG. 1 illustrates an environment (that is exemplary) in which various embodiments may function.

Additional illustrative embodiments are listed below. In one embodiment, an environment 100 (that is exemplary) in which various embodiments may function is illustrated in FIG. 1. Environment 100 includes a plurality of IoT device networks, such that each IoT device network is associated with an IoT subscriber. The plurality of IoT device networks may include a car IoT network 102 that is associated with owner of the car (in other words, an IoT subscriber) that may be moving from one point to another. Car IoT network 102 includes a plurality of car IoT devices. The plurality of IoT networks may also include a home IoT network 104 associated with one or more owners of the house. Home IoT network 104 also includes a plurality of home IoT devices.

At first time instant, car IoT network 102 is located at a location 106 that may be closer to home. For example, the car may be parked in a garage at the home. As a result, both car IoT network 102 and home IoT network 104 communicate with a gateway 108, which enables communication between car IoT network 102 and home IoT network 104. Gateway 108 may be an IoT gateway or may be a smartphone. Alternatively, IoT device in each of car IoT network 102 and home IoT network 104 may directly communicate with a Macro cellular and Core Network (MCN) 110 without requiring gateway 108.

Subsequently, the car may move from location 106, which is closer to home, to a location 112 that may be a gas station, Location 112 also includes a gas station IoT network 114. Once the car is at location 112, car IoT network 102 communicates with MCN 110 and gas station IoT network 114 through a gateway 116. Gas station IoT 114 also communicates with MCN 110 through gateway 116, MCN 110 further is in communication with a plurality of IoT applications, for example, an IoT application 118 and an IoT application 120.

The connectivity of different IoT networks facilitated through gateways and MCN 110 enables immediate resolution of any issue that is detected by one or more IoT device in any one of these IoT networks, for example, car IoT network 102. For example, the car may have one or more issues that may or may not be critical and need to be fixed either immediately or at a service station at a certain distance from the car. The issues detected by car IoT network 102 may include, but are not limited to impending collision with another vehicle, heated up engine, almost empty petrol tank, low air pressure in a tyre, non-critical service request, and reminder for periodic car maintenance service. In a similar manner, issues detected by home IoT network 104 may include renewal of subscription for a channel in the in-house entertainment system, a gas leak, a fire alarm going off, and leakage of water. It will be apparent to a person skilled in the art that the invention may be implemented in any communication network and is not limited to environment 100.

Figure 2B:
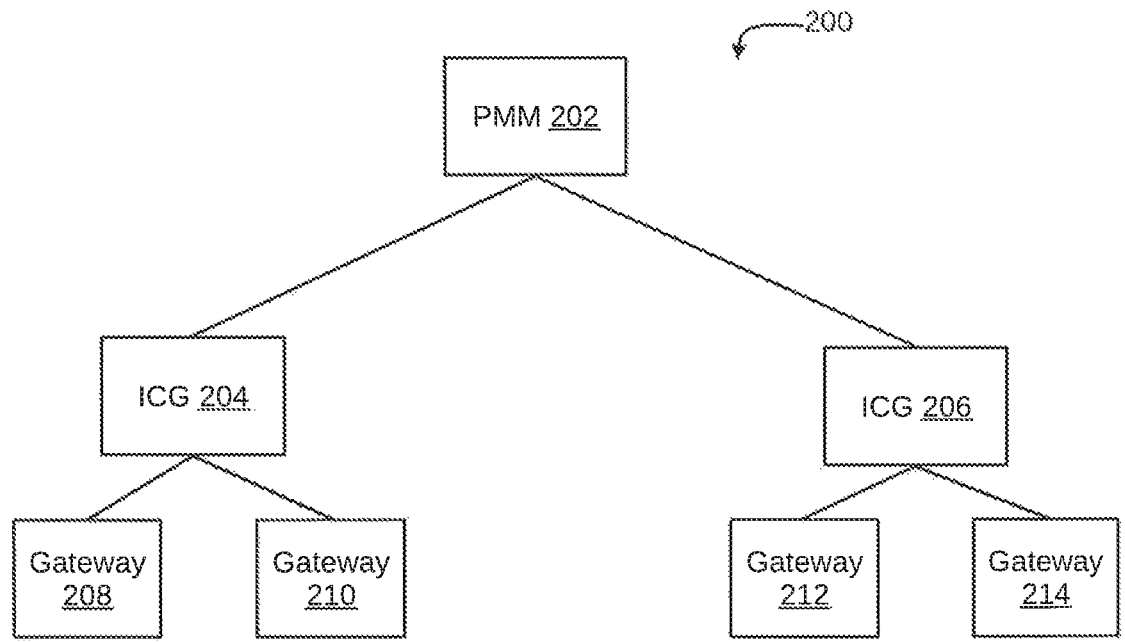
FIGS. 2A and 2B illustrate network level view of a system for provisioning collective perception in a communication network and interaction between various components of a perception management module within the system, in accordance with an embodiment.
Figure 2A:
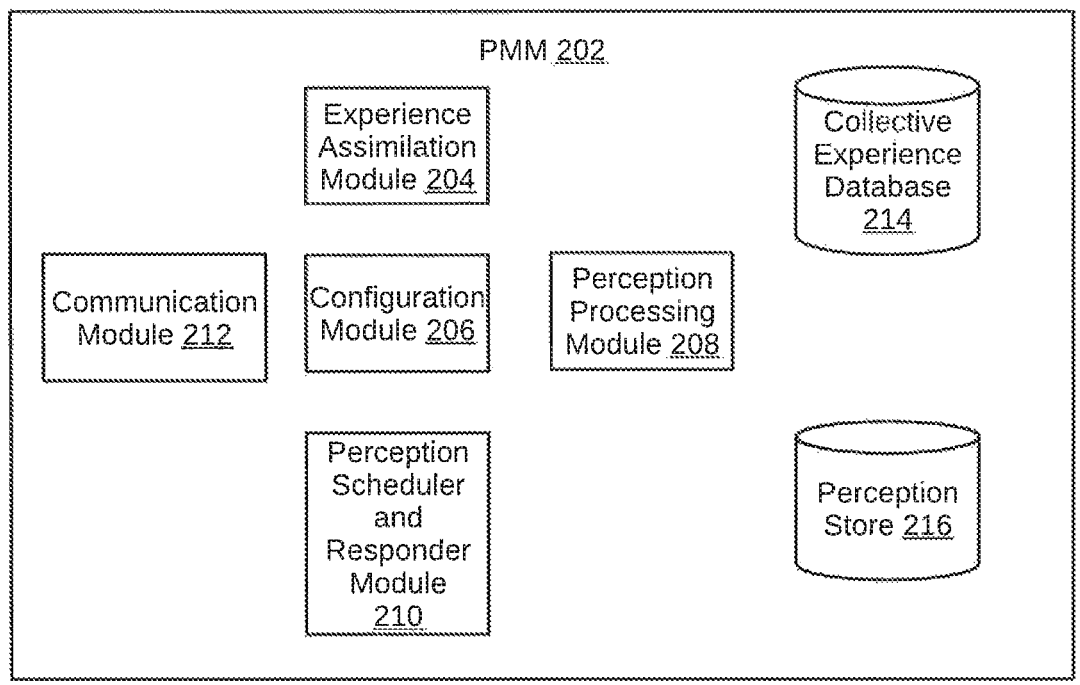

Referring now to FIGS. 2A and 2B, network level view of a system 200 for provisioning collective perception in a communication network and interaction between various components of a Perception Management Module (PMM) 202 within system 100 is illustrated, in accordance with an embodiment. In system 200, PMM 202 is communicatively coupled to a plurality of Inter-Connect Gateways (ICG), for example, an ICG 204 and an ICG 206. Each of the plurality of ICGs are further communicatively coupled to a plurality of gateways. For example, ICG 204 may be communicatively coupled to gateways 208 and 210, while ICG 206 may be communicatively coupled to gateways 212 and 214. Details of the plurality of ICG and the plurality of gateways is explained in detail in a co-pending application, titled, "METHOD AND SYSTEM FOR DYNAMICALLY ADAPTING PRIVACY AND SECURITY FOR INTERNET OF THINGS (IOT) COMMUNICATION," having application number, "US20170272940A1," and filed on, "Mar. 16, 2017."

PMM 202 may be part of a network device (not shown in FIG. 2b). The network device, for example, may include, but is not limited to an application server, a server, a gateway, or a router. The network device may include a processor and a memory that stores processor instructions, which when executed causes the processor to perform functionalities defined for PMM 202. PMM 202 may further include an experience assimilation module (EA-MOD) 204, a configuration module (PER-CM-MOD) 206, a perception processing module (PER-PROC-MOD) 208, a perception scheduler and responder module (PER-SCHED-RSP-MOD) 210, a communications module (PER-COMM-MOD) 212, a plurality of databases, for example, a collective experience database 214, and a perception store 216.

EA-MOD 204 is responsible for receiving all the perception data from a communication entity in the communication network, for example, the ICG (or any other IoT network element in case of exceptions) through PER-COMM-MOD 212. The perception data may include, but are not limited to: data when one or more exceptions were encountered, data when a session ended, or during partial completion of a communication session (for example, a specific transaction within the session was completed in an IoT session). EA-MOD 204 converts the received perception-data into a standard format based one or more perception data categories, that may include, exception-perception data category and regular-perception data category.

The perception data associated with the exception-perception data category (EXC-FEED) is created upon receiving perception data from a communication entity (for example, the IoT network/ICG) when an exception has occurred. In an exemplary embodiment, EXC-FEED may be represented using table 1 given below. CRE denotes Communicating Remote Entity.

TABLE 1

| Field | SESSION-INFO | UID | ID-CLASS | ID-DET | EXC-CTX |
|---|---|---|---|---|---|
| Description of contents | Session ID and class | CRE-ID | Nature of CRE (CRE class) | Identity details such as group id or individual id | Exception Context |

In the above table, exception context may include details, such as, type of exception (for example, security-exception (SEC-EXC), privacy-exception (PRIV-EXC), or communication exception (COMM-EXC)), details of the exception (for example, unencrypted transmission, privacy exposure, or jamming), environment/context of the exception, which includes details such as location category (public/private), location (GPS co-ordinates or location type such as gas station, etc.), time of day, details of when the exception occurred, for example, when exchanging sensitive information, during session setup/extension, change in purpose, arrival of a new party, etc.

The perception data associated with the regular-perception data category (PER-FEED) is created upon receiving perception data from a communication entity, when a communication session has ended, or during partial completion of a communication session. In an exemplary embodiment, PER-FEED may be represented using table 2 given below:

TABLE 2

| Field | SESSION-INFO | UID | ID-CLASS | ID-DET | EXP-SEC-LVL-CRE | EXP-PRIV-LVL-CRE | EXP-NEED-FULFILL-REC-CRE |
|---|---|---|---|---|---|---|---|
| Description of contents | Session ID and class | CRE-ID | Nature of CRE (class) | Identity details such as group id or individual id | Usual Security level of the CRE | Usual Privacy level of the CRE | Aggregated Fulfilment Record of CRE |

Based on the above perception inputs, EA-MOD 204 creates a Global Collective Experience Record (GCE-REC) entry in the Global Collective Experience Record Table (GCE-REC-TABLE) if an entry does not exist for that CRE for that specific communication session (for example, IoT session), else it updates the relevant entry in the GCE-REC-TABLE. The contents of each entry in the GCE-REC-TABLE is shown below. One GCE-REC entry is created in the GCE-REC-TABLE for every communication session (for example IoT session) for each CRE. In an exemplary embodiment, the GCE-REC may be depicted by table 3 and the GCE-REC-TABLE is depicted by table 4 given below:

TABLE 3

| Field | SESSION-INFO | UID | ID-CLASS | ID-DET | EXP-SEC-LVL-CRE | EXP-PRIV-LVL-CRE | EXP-NEED-FULFILL-REC-CRE | EXC-INFO |
|---|---|---|---|---|---|---|---|---|
| Description | Session ID and class | CRE-ID | Nature of CRE (class) | Identity details such as group id or individual id | Usual Security level of the CRE | Usual Privacy level of the CRE | Aggregated Fulfilment Record of CRE | Details of exceptions encountered |

Exception contexts may include all exception contexts received up to that point of time for the session (i.e., accumulation of all relevant info from EXC-FEEDS received for the session).

TABLE 4

| SESSION-INFO | UID | ID-CLASS | ID-DET | EXP-SEC-LVL-CRE | EXP-PRIV-LVL-CRE | EXP-NEED-FULFILL-REC-CRE | EXC-INFO |
|---|---|---|---|---|---|---|---|
| Session ID1 | CRE-ID1 | Class1 (car IoT) | Group-id3 (Car IoT Id) | Sec-Level-3 (secure channel only) | Priv-Level-4 (2-level authentication, masking of individual id) | 70% | 1. High interference (2 instances), details such as <communication channel used, time stamp, info exchanged, etc.> 2. Use of unencrypted channel - 1 instance, details such as <info exchanged, reason for exception - e.g., low battery, etc.> |
| Session ID2 | CRE-ID1 | | | | | | |
| ... | | | | | | | |
| Session ID k | CRE-ID2 | | | | | | |
| ... | | | | | | | |
| Session ID m | CRE-ID n | | | | | | |
| ... | | | | | | | |

EA-MOD 204 passes the relevant inputs to PER-CM-MOD 206 along with the info on which entries in the GCE-REC-TABLE were created or updated. The GCE-REC-TABLE is persisted in collective experience database 214.

PER-CM-MOD 206 obtains input configurations from the network operator, and passes them to the relevant modules within PMM 202. Examples of such configuration parameters or inputs and their use include initial threshold settings for specific (or generic) minor exceptions for sending updated perception data to the communication entities (for example ICGs) associated with PMM 202 (and consequently to the involved IoT networks). The configuration parameters further include communication channel configurations (for example, security, latency, reliability) for obtaining the perception data, and for communicating the perception information, initial settings and thresholds associated with parameters such as service-fulfillment-need of communicating party (consumer), service-fulfilment-ability of communicating party (provider), delivered-service-quality, reliability, authenticity, etc.

The configuration parameters further include EXC-CRT-MAPPING-TABLE, which provides the criticality level of the exception based on exception type and exception details; EXC-THRES, which are thresholds for number of exceptions within a session and includes thresholds for specific exceptions as well as exception type. In addition, thresholds for number of exceptions within a time window (e.g., 1 minute) may also be included; REC-PRIV-LVL-TABLE, which contains the mapping of recommended privacy level based on the privacy exceptions encountered during the session, and comparing with past trends; REC-SEC-LVL-TABLE, which contains the mapping of recommended security level based on security exceptions encountered during the session, and comparing with past trends; REC-PRIV-COMPL-LVL-TABLE, which contains the mapping of privacy compliance level based on the number and type of privacy exceptions encountered during the session; REC-SEC-COMPL-LVL-TABLE, which contains the mapping of security compliance level based on the number and type of security exceptions encountered during the session; REC-NEED-FULFILL-LVL-TABLE, which contains the mapping of need fulfillment level based on the exception type; NEED-FULFILL-FACTOR-TABLE, which contains the mapping of NEED-FULFILL-FACTOR based on the number of exceptions; NEED-SCF, which is a factor that indicates the influence of past need fulfillment record on the recommended need fulfillment level (value is between 0 and 1); REL-VAUE-TABLE, which contains the mapping of REL-VALUE based on the exception type and criticality level of the exception; REL-FACTOR-TABLE, which contains the REL-FACTOR mapping based on the number of exceptions that have occurred thus far in the session; and REL-SCF, which is a factor that indicates the influence of reliability record on the recommended reliability level (value is between 0 and 1).

PER-PROC-MOD 208 is responsible for processing the perception data and forming the composite perception information. PER-PROC-MOD 208 processes the perception data on a periodic basis (for example, once every 15 minutes) or upon specific trigger by EA-MOD 204. Upon receipt of PER-FEED from EA-MOD 204, PER-PROC-MOD 208 processes the PER-FEED and creates or updates the Global Collective Perception Record (GLOB-COL-PER-REC) for the CRE in the GLOB-COL-PER-REC-TABLE. In an exemplary embodiment, the layout of the GLOB-COL-PER-REC may be represented by table 5 and the GLOB-COL-PER-TABLE by table 6 below:

TABLE 5

| Field name | UID | ID-CLASS | ID-DET | USU-SEC-LVL-CRE | USU-PRIV-LVL-CRE | AGGREG-NEED-FULFILL-REC-CRE | AGGREG-SEC-COMPL-REC-CRE | AGGREG-PRIV-COMPL-REC-CRE | AGGREG-REL-REC-CRE | PERC_SCORE |
|---|---|---|---|---|---|---|---|---|---|---|
| Description | CRE-ID | Nature of CRE (class) | Identity details such as group id or individual id | Usual Security level of the CRE | Usual Privacy level of the CRE | Aggregated Fulfilment Record of CRE | Aggregated Security Compliance Record of CRE | Aggregated Privacy Compliance Record of CRE | Aggregated Reliability Rec | Overall Perception Score |

TABLE 6

| UID | ID-CLASS | ID-DET | USU-SEC-LVL-CRE | USU-PRIV-LVL-CRE | AGGREG-NEED-FULFILL-REC-CRE | AGGREG-SEC-COMPL-REC-CRE | AGGREG-PRIV-COMPL-REC-CRE | AGGREG-REL-REC-CRE | PERC_SCORE |
|---|---|---|---|---|---|---|---|---|---|
| CRE-ID1 | Class1 (car IoT) | Group-id3 (Car IoT Id) | Sec-Level-3 (secure channel only) | Priv-Level-4 (2-level authentication, masking of individual id) | 60% | 75% | 72% | 65% | 68% |
| CRE-ID2 | ... | ... | ... | ... | ... | ... | ... | ... | ... |
| ... | ... | ... | ... | ... | ... | ... | ... | ... | ... |
| CRE-IDn | ... | ... | ... | ... | ... | ... | ... | ... | ... |

AGGREG-REL-REG-CRE is an aggregated score that is computed taking into consideration privacy compliance, security compliance, need fulfillment level, and all exceptions. It may be computed as a weighted average of these attributes. The PERC-SCORE (overall perception score) is an indicative score of the perception of the CRE, for example, to give an indication of whether the CRE is reliable and trustworthy, complies to privacy and security, fulfills the needs, etc. It may be an index value on a fixed scale, for example, 1-5, with 1 being lowest (so it is not recommended to establish a session with the CRE, or if a session is being established, act with utmost caution and/or have lowest level of expectations with respect to fulfillment of need), and 5 being the highest (it is highly recommended to establish a session with the CRE).

Upon receipt of the EXC-FEED from EA-MOD 204, PER-PROC-MOD 208 processes it and creates or updates the Global Selective Perception Record (GLOB-SEL-PER-REC) for the CRE in the Global Selective Perception Record Table (GLOB-SEL-PER-REC-TABLE). In an exemplary embodiment, the layout of the GLOB-SEL-PER-REC is depicted in table 7 and the GLOB-SEL-PER-REC-TABLE is depicted in table 8 given below:

LVL-TABLE, the REC-SEC-LVL-TABLE, the REC-PRIV-COMPL-LVL-TABLE, the REC-SEC-COMPL-LVL-TABLE, and the REC-NEED-FULFILL-LVL-TABLE based on the learning from past sessions. The learning may be performed by comparing present exception trends with past trends in historical data using well-known analytics or machine learning techniques, or using any proprietary algorithms also. Such learning may be performed using dedi-

TABLE 7

| Field Name | UID | ID-CLASS | ID-DET | EXC-CRT-LVL | REC-SEC-LVL-CRE | REC-PRIV-LVL-CRE | REC-NEED-FULFILL-LVL-CRE |
|---|---|---|---|---|---|---|---|
| Description | CRE-ID | Nature of CRE (class) | Identity details such as group id or individual id | EXC Criticality Level | Recommended Security level of the CRE | Recommended Privacy level of the CRE | Recommended Need Fulfilment Level of CRE |

| Field Name | REC-SEC-COMPL-LVL-CRE | REC-PRIV-COMPL-LVL-CRE | REC-REL-LVL-CRE | Overall REC-CRE |
|---|---|---|---|---|
| Description | Recommended Security Compliance Level of CRE | Recommended Privacy Compliance Level of CRE | Recommended Reliability Level | Overall Recommendation for the CRE |

TABLE 8

| UID | ID-CLASS | ID-DET | EXC-CRT-LVL | REC-SEC-LVL-CRE | REC-PRIV-LVL-CRE | REC-NEED-FULFILL-LVL-CRE | REC-SEC-COMPL-LVL-CRE | REC-PRIV-COMPL-LVL-CRE | REC-REL-LVL-CRE | Overall REC-CRE |
|---|---|---|---|---|---|---|---|---|---|---|
| CRE-ID1 | Class 1 (car IoT) | Group-id3 (Car IoT Id) | Criticality-Level-3 (high) | Sec-Level-4 (secure and encrypted) | Priv-Level-4 (2-level authentication, masking of individual id) | 60% | 70% | 66% | 65% | 50% (Neutral) |
| CRE-ID2 | | | | | | | | | | |
| ... | | | | | | | | | | |
| CRE-IDk | | | | | | | | | | |

Whenever PER-PROC-MOD 208 updates the GLOB-COL-PER-REC-TABLE, it fetches relevant entries from the GLOB-SEL-PER-REC-TABLE as one of the inputs apart from the inputs provided by EA-MOD 204 and the GCE-REC-TABLE. The entries in the GLOB-SEL-PER-REC-TABLE are removed upon taking them into consideration for processing while updating the GLOB-COL-PER-REC-TABLE, and when there are no outstanding transmissions by PER-COMM-MOD 212 (determined by checking the transmission schedule and transmission status) of those entries.

Whenever PER-PROC-MOD 208 performs any processing of perception inputs, it passes relevant information to PER-SCHED-RSP-MOD 210 to enable appropriate scheduling of the transmission of perception information. PER-PROC-MOD 208 also adapts the entries in the REC-PRIVcated processors which are appropriate for such complex computations involving a large data set (and may be custom-built or well-known ones).

PER-PROC-MOD 208 includes recent entries of the GCE-REC-TABLE in-memory for fast access. PER-PROC-MOD 208 also contains the recently modified entries of the GLOB-COL-PER-REC-TABLE and relevant unsent entries of the GLOBAL-SEL-PER-REC-TABLE in-memory for fast access. Persistence of the GLOB-COL-PER-REC-TABLE and the GLOB-SEL-PER-REC-TABLE is taken care by dedicated databases (i.e., collective experience database 214 and perception store 216, respectively).

PER-SCHED-RSP-MOD 210 is responsible for receiving the perception request (PERC-REQST) from PER-COMM-MOD 212 and passing the request to PER-PROC-MOD 208.

Upon receiving the perception data to be sent in response to the PERC-REQST, PER-SCHED-RSP-MOD 210 schedules the transmission of the response (PERC-RSP). The PERC-REQST includes information, such as, but not limited to identity of the requestor and the CRE, relevant information obtained/collected about the session and/or the CRE (for example, purpose), context (location, presence of other parties, etc.), priority/criticality (for example, an IoT communication session involving highly critical and low latency communication exchange is of higher priority).

PER-SCHED-RSP-MOD 210 is also responsible for scheduling the transmission of perception data to one or more communication entities (for example, ICGs). Two possible cases exist, first, when transmission of perception data arises out of one or more exception feeds, due to which the GLOB-SEL-PER-REC-TABLE has been modified. The transmission schedule of the perception information to be sent could depend on the criticality of the exception (for example, highly critical implies immediate transmission). Second, when transmission of perception data arising out of updates to the GLOB-COL-PER-REC-TABLE. In this case, the transmission schedule could depend on the extent of updates to the relevant GLOB-COL-PER-REC entries. For example, in case of a drastic change in the PERC-SCORE, the information may be scheduled to be transmitted with a lower latency between successive transmissions.

PER-COMM-MOD 212 is responsible for receiving the exception-perception data and the regular-perception data from one or more communication entities (for example, the ICG) and passing them to PER-PROC-MOD 208. PER-COMM-MOD 212 is also responsible for receiving the perception request from a communication entity (for example, the ICG) and passing them to PER-SCHED-RSP-MOD 210 and for sending the perception data to the ICG according to the schedule as provided by PER-SCHED-RSP-MOD 210 and using the appropriate communication channel based on the priority and security requirements.

With regard to the databases, collective experience database 214 includes the GCE-REC-TABLE entries. Collective experience database 214 is updated by EA-MOD 204 and accessed by PER-PROC-MOD 208. Collective experience database 214 may involve fast access to enable near real-time processing of the experience records. Perception store 216 includes the GLOB-COL-PER-REC-TABLE and GLOB-SEL-PER-REC-TABLE entries. Perception store 216 is updated by PER-PROC-MOD 208 and accessed by PER-SCHED-RSP-MOD 210.

Figure 3:
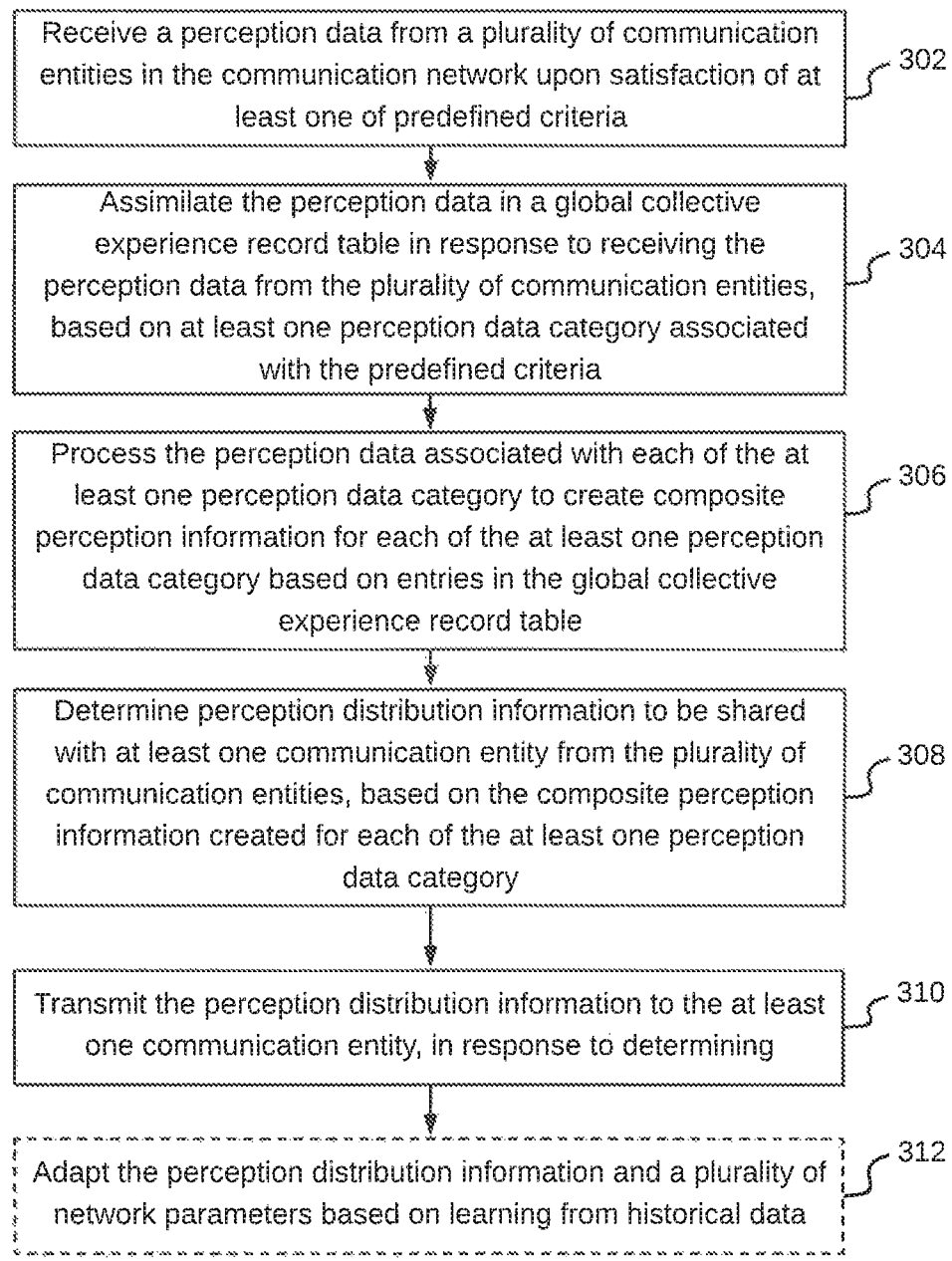
FIG. 3 illustrates a flow chart of a method for provisioning collective perception in a communication network, in accordance with an embodiment.

Referring now to FIG. 3, a flow chart of a method for provisioning collective perception in a communication network is illustrated, in accordance with an embodiment. The communication network, for example, may be an IoT network. At step 302, the network device may receive perception data from a plurality of communication entities in the communication network upon satisfaction of one or more predefined criteria. In case the communication network is an IoT network, the plurality of communication entities may include one or more of an IoT device, an IoT GW, or an ICG.

The one or more predefined criteria may include, but are not limited to occurrence of an exception during a communication session in the communication network, partial completion of the communication session, or completion of the communication session. In an embodiment, PER-COMM-MOD 212 in PMM 202 receives perception data (or perception inputs) from an ICG (which may have been generated at the ICG or sent from an IoT network, via the ICG). The perception data may have been received by PER-COMM-MOD 212 (from the ICG) upon satisfaction of one or more of the predefined criteria. PER-COMM-MOD 212 then passes the received perception data to EA-MOD 204.

At step 304, based on one or more perception data categories associated with the predefined criteria, the network device may assimilate the perception data in a Global Collective Experience Record Table (GCE-REC-TABLE) in response to receiving the perception data from the plurality of communication entities. The one or more perception data categories may include an exception-perception data category and a regular-perception data category. In order to assimilate the perception data, the network device may ascertain the relevant perception data category from the one or more perception data categories for the perception data. In an embodiment, in response to ascertaining, the network device may update the GCE-REC-TABLE. This is further explained in detail in conjunction with FIG. 5.

In an embodiment, upon receiving the perception data, EA-MOD 204 first ascertains the nature of perception data, i.e., whether it is associated with an exception-perception data category or regular-perception data category, which is received during or after a session has ended (i.e., normal session-related perception data). To this end, EA-MOD 204 examines contents of the perception data. By way of an example, presence of exception-related information means that the perception data is associated with exception-perception data category. Based on this analysis, EA-MOD 204 may format the perception data into data associated with exception-perception data category or regular-perception data category. Thereafter, EA-MOD 204 sends the perception data associated with a perception data category along with information regarding updating of the GCE-REC-TABLE to PER-PROC-MOD 208 for further processing.

Based on a perception data category associated with the perception data, at step 306, the network device may process the perception data (inputs) associated with each of the one or more perception data categories to create a composite perception information for each of the one or more perception data categories. The perception data may be processed based on the associated perception data category. The perception data associated with each of the one or more perception data categories may be processed periodically after predefined time period or in response to a predefined trigger event. In other words, relevant entries in a Global Selective Perception Record Table (GLOBAL-SEL-PER-REC-TABLE) or in a Global Collective Perception Record Table (GLOBAL-COL-PER-REC-TABLE) may be created or updated for the perception data associated with the exception-perception data category and the regular-perception data category.

The composite perception information may include a selective perception information and a collective perception information. The selective perception information may include one or more of, but is not limited to one or more Identifiers (IDs), group ID, class, security level, privacy level, aggregated fulfillment record, aggregated security compliance record, aggregated privacy compliance record, aggregated reliability record, or overall perception score. Similarly, the collective perception information may include one or more of, but is not limited to ID, group ID, class, exception criticality level, recommended security level, recommended privacy compliance level, recommended fulfillment level, recommended compliance level, recommended privacy compliance level, recommended reliability level, or overall recommendation.

When the network device processes the relevant entries in the GCE-REC-TABLE associated with the exception-perception data category, the network device may update the GLOB-SEL-PER-REC-TABLE that includes the selective perception information. Similarly, when the network device processes the relevant entries in the GCE-REC-TABLE associated with the regular-perception data category, the network device may update the GLOB-COL-PER-REC-TABLE that includes the collective perception information. In an embodiment, PER-PROC-MOD 208 processes the received perception data and updates the GLOB-SEL-PER-REC-TABLE and the GLOB-COL-PER-REC-TABLE. This is further explained in detail in conjunction with FIG. 5.

Based on the composite perception information created for the one or more perception data categories, the network device, at step 308, may determine perception distribution information to be shared with one or more communication entities from the plurality of communication entities. The perception distribution information may be determined after predefined time period or in response to a predefined trigger event. Thus, there may be two possible scenarios. In the first scenario, the perception distribution information to be shared with the one or more communication entities may be determined in response to a received perception request. This is further explained in conjunction with FIG. 4. In the second scenario, the perception distribution information to be shared with the one or more communication entities may be determined in response to a predefined trigger event/exception or periodically after expiry of a time period.

In an embodiment, in response to the perception request, PER-PROC-MOD 208 prepares the perception distribution information for the specific communication network (for example, an IoTN) for which the perception request was received. In order to prepare the perception distribution information, for selective perception information, PER-PROC-MOD 208 checks if there is any pending record in the GLOB-SEL-PER-REC-TABLE, by checking pending records with a matching CRE-id. PER-PROC-MOD 208 may also check for matching CRE-class (ID-CLASS) in the GLOB-SEL-PER-REC-TABLE and may decide to include it in the selective perception information to be sent as part of the perception distribution information. Similarly, for collective perception information, PER-PROC-MOD 208 checks if there is any update in the GLOB-COL-PER-REC corresponding to the CRE in the GLOB-COL-PER-REC-TABLE, and if there is any update, PER-PROC-MOD 208 may include it in the collective perception information to be sent as part of the perception distribution information. PER-PROC-MOD 208 then composes the selective perception information and collective perception information thus extracted, and sends it to PER-SCHED-RSP-MOD 210. PER-SCHED-RSP-MOD 210 then schedules the perception distribution information to be sent in the perception response (PER-RSP) using the same communication channel over which the perception request was received.

In another embodiment, the perception distribution information may be determined in response to a predefined trigger event/exception. This case arises when one or more exceptions have been reported to PMM 202. PER-PROC-MOD 208 determines the communication network (for example, IoTNs) to which the selective perception information has to be sent by accessing the GCE-REC-TABLE. Additionally, PER-PROC-MOD 208 fetches details of the relevant communication networks which have communicated with the particular CRE during a predefined period, for example, during the last 15 days. Based on the type of exception, PER-PROC-MOD 208 may also fetch details of the relevant communication networks (in order to send the selective perception information) which have communicated with those CREs whose CRE-type is the same as the one which caused the exception.

PER-PROC-MOD 208 may then form a distribution list that includes one or more communication entities to whom the selective perception information should be sent. PER-PROC-MOD 208 then sends the distribution list to PER-SCHED-RSP-MOD 210. PER-SCHED-RSP-MOD 210 checks if the criticality level of the exception (EXC-CRT-LVL) is greater than a pre-defined threshold (EXC-CRT-LVL-THRESH). If the EXC-CRT-LVL is greater than EXC-CRT-LVL-THRESH, then PER-SCHED-RSP-MOD 210 schedules the transmission of the perception information through fast channels and/or immediate transmission over available channels. If the EXC-CRT-LVL is not greater than EXC-CRT-LVL-THRESH, then PER-SCHED-RSP-MOD 210 may decide to send the information over normal (non-priority) channels or may defer the transmission until the next time-interval based transmission of perception info. PER-SCHED-RSP-MOD 210 may also decide to send certain information over priority/fast channels even when the EXC-CRT-LVL is not greater than EXC-CRT-LVL-THRESH, if based on past learning (by comparing exception trends in current session with trends in past sessions involving the CRE), further exceptions or undesirable events are predicted to occur in a short timeframe (e.g., within the next 2 minutes).

In yet another embodiment, in response to expiry of a time period, PER-PROC-MOD 208 performs the following steps periodically, for example, once every 30 minutes. For each of the CREs for which an entry is present in the GLOBAL-SEL-PER-REC-TABLE, PER-PROC-MOD 208 prepares or updates collective perception information and updates the GLOB-COL-PER-TABLE. Referring back to step 306, in this case instead of the perception data input received, the one or more entries in the GLOBAL-SEL-PER-REC-TABLE may be used as an input for further processing. PER-PROC-MOD 208 fetches all relevant entries that have been updated in the GLOB-COL-PER-TABLE, for example, by checking the timestamp of last update of entries. This may include the entries updated in GLOBAL-COL-PER-TABLE in above step, as well as entries updated in GLOBAL-COL-PER-TABLE on reception of perception data since the last periodic cycle. Further, PER-PROC-MOD 208 forms the distribution list (for example, list of IoTNs) to whom the collective perception information has to be sent. For example, PER-PROC-MOD 208 may check the IoTNs which have communicated during the last 15 days with those CREs whose entries have been fetched before. PER-PROC-MOD 208 also prepares the contents of the perception distribution information to be sent to each of communication entities identified above using the entries fetched in the steps discussed above.

Based on observation of amount of data sent, for example, once every 30 minutes during the last 'n' cycles, PER-SCHED-RSP-MOD 210 may learn and adapt the periodicity of time-bound delivery. In an exemplary embodiment, PER-SCHED-RSP-MOD 210 may use the equation 1 given below to learn and adapt:

$$\text{NEW-PERIODICITY} = \text{CURRENT-PERIODICITY} * (\text{STD-DATA-SIZE}/\text{AVG-DATA-SIZE}) * \text{PERD-SCF} \quad (1)$$

where,
NEW-PERIODICITY=Newly computed periodicity
CURRENT-PERIODICITY=Existing periodicity
STD-DATA-SIZE=Amount of data normally expected to be delivered, which is a pre-provisioned value. It may be expressed as number of perception records, or in bytes
AVG-DATA-SIZE=Average of amount of data sent in last 'n' cycles, and is computed in the same measurement unit as STD-DATA-SIZE
PERD-SCF=Scaling factor.

Thereafter, at step 310, the network device transmits the perception distribution information to the at least one communication entity. In an embodiment, PER-PROC-MOD 208 may pass the prepared contents along with the distribution list to PER-SCHED-RSP-MOD 210. PER-SCHED-RSP-MOD 210 then schedules the transmission of the perception info to all communication entities (for example, IoTNs) in the distribution list. In another embodiment, PER-COMM-MOD 212 may transmit the perception distribution information to the list of communication networks (for example, IoTNs) provided by PER-SCHED-RSP-MOD 210 according to the transmission schedule and channel info provided by PER-SCHED-RSP-MOD 210. PER-COMM-MOD 212 may transmit the perception distribution information to the relevant communication networks, for example, to the relevant IoTNs by sending it to the ICG associated with the IoTNs. At step 312, the network device may adapt the perception distribution information and a plurality of network parameters based on learning from historical data.

Figure 4:
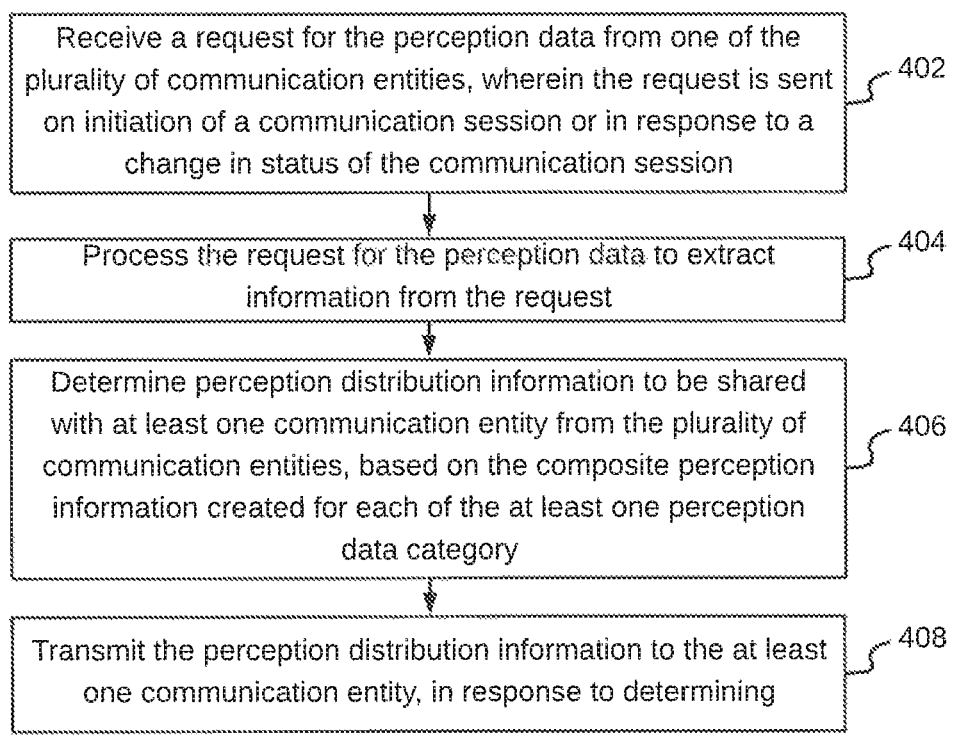
FIG. 4 illustrates a flow chart of a method for provisioning collective perception in a communication network, in accordance with another embodiment.

Referring now to FIG. 4, a flowchart of a method for provisioning collective perception in a communication network is illustrated, in accordance with another embodiment. At step 402 the network device may receive a request for perception data from one of a plurality of communication entities.

The request may be sent on initiation of a communication session. Alternatively, the request may be sent in response to a change in status of the communication session. In an embodiment, PER-COMM-MOD 212 in PMM 202 may receive a request for perception input (i.e., PERC-REQST). The request may be received at the start of a communication session (which may be an IoT session). The request may be received during a communication session due to a change in one or more of, but not limited to context or purpose (i.e., change in status) of the communication session. PER-COMM-MOD 212 passes the received request to PER-SCHED-RSP-MOD 210 in PMM 202.

Thereafter, at step 404 the network device may process the request for the perception data to extract information from the request. In an embodiment, PER-SCHED-RSP-MOD 210 extracts the information from the received PERC-REQST and stores the details, which may include, but are not limited to communication channel used, encryption info, priority, criticality, etc. PER-SCHED-RSP-MOD 210 then passes the PERC-REQST to PER-PROC-MOD 208 in order to provide the relevant perception inputs that are to be sent in response to the PERC-REQST. Thereafter steps 406 and 408 are performed, which are analogous to steps 308 and 310. These steps have already been explained in detail in conjunction with FIG. 3

Figure 5:
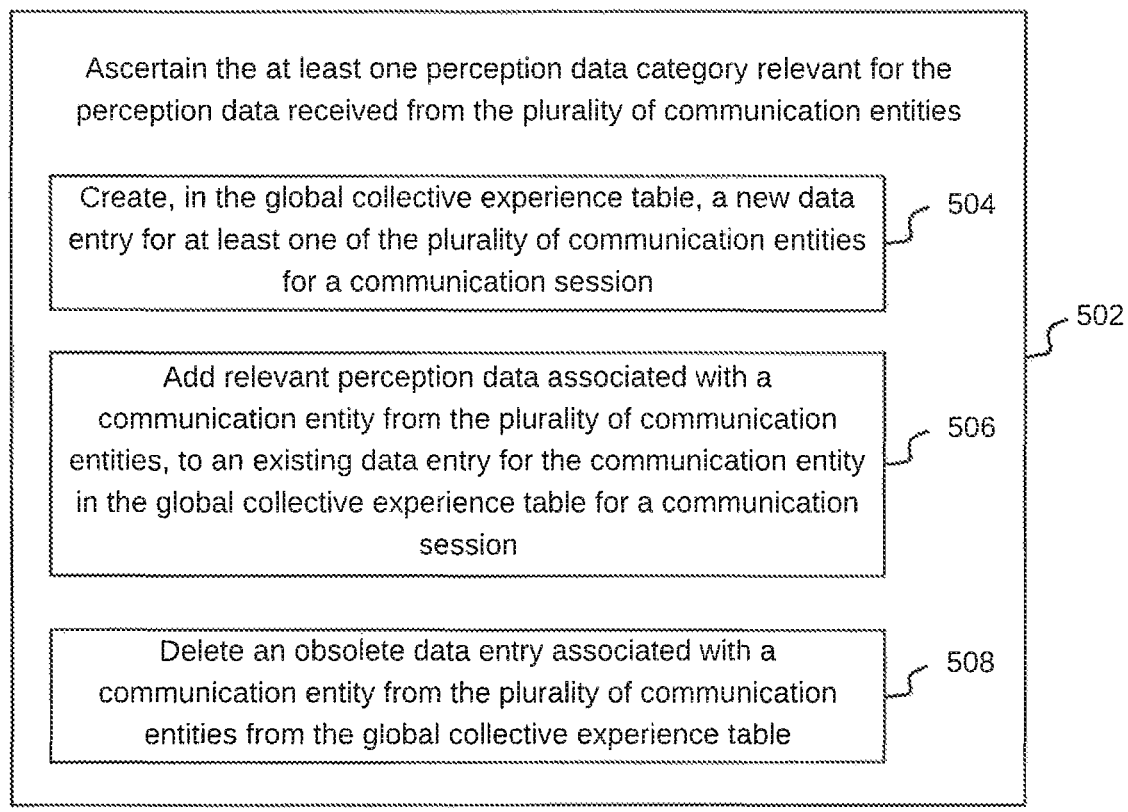
FIG. 5 illustrates a flowchart of a method for assimilating the perception data in a global collective experience table in response to receiving the perception data from a plurality of communication entities, in accordance with an embodiment.

Referring now to FIG. 5, a flowchart of a method for assimilating the perception data in a GCE-REC-TABLE in response to receiving the perception data from a plurality of communication entities is illustrated, in accordance with an embodiment. Referring back to step 304, in order to assimilate the perception data in the GCE-REC-TABLE, the network device, at step 502, ascertains the one or more perception data categories relevant for the perception data received from the plurality of communication entities. The step 502 further include steps 504, 506, and 508. It will be apparent to a person skilled in the art that steps 504, 506, and 508 may be mutually exclusive and are not executed in a sequence.

At step 504, the network device may create a new data entry in the GCE-REC-TABLE for one or more of the plurality of communication entities for a communication session. At step 506, the network device may add relevant perception data associated with a communication entity from the plurality of communication entities, to an existing data entry for the communication entity in the GCE-REC-TABLE for a communication session. In an embodiment, EA-MOD 204 may create a GCE-REC entry in the GCE-REC-TABLE, if an entry does not exist for that CRE for that specific IoT session, else EA-MOD 204 updates the relevant entry in the GCE-REC-TABLE. By way of an example, if an exception feed was received, and an entry already exists in the GCE-REC-TABLE for that CRE for that specific IoT session, EA-MOD 204 adds the exception context info to the existing entry.

At step 508, the network device may delete an obsolete data entry associated with a communication entity from the plurality of communication entities from the GCE-REC-TABLE. In an embodiment, EA-MOD 204 also checks if any outdated entries must be removed, and removes such outdated entries. For example, entries which are older than a certain threshold duration (for example, older than six months), or entries which have never been used beyond a certain duration (for example, not used during last three months), may be removed from the GCE-REC-TABLE.

Figure 6:
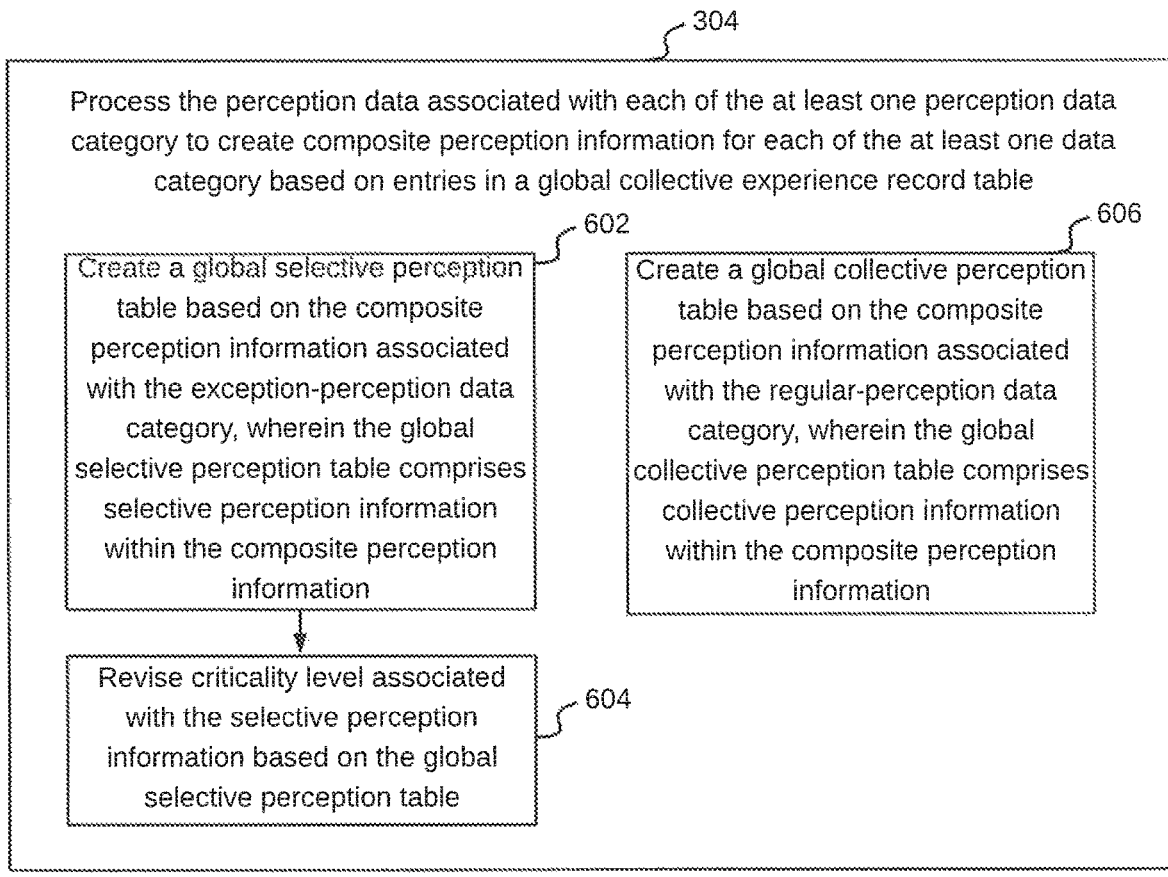
FIG. 6 illustrates a flowchart of a method for processing perception data associated with one or more perception data categories to create composite perception information is illustrated, in accordance with an embodiment.

Referring now to FIG. 6, a flowchart of a method for processing perception data inputs associated with one or more perception data categories to create composite perception information is illustrated, in accordance with an embodiment. Referring back to step 306, the network device processes the perception data associated with each of the one or more perception data categories to create composite perception information for each of the one or more perception data categories based on relevant entries in the GCE-REC-TABLE.

The composite perception information includes selective perception information and collective perception information. The selective perception information for a communication entity includes one or more of, but is not limited to ID, group ID, class, security level, privacy level, aggregated fulfillment record, aggregated security compliance record, aggregated privacy compliance record, aggregated reliability record, or overall perception score. The collective perception information for a communication entity includes one or more of, but is not limited to ID, group ID, class, exception criticality level, recommended security level, recommended privacy compliance level, recommended fulfillment level, recommended compliance level, recommended privacy compliance level, recommended reliability level, or overall recommendation.

The step 306 includes steps 602, 604, and 606. Though, steps 602 and 604 are in sequence, the step 606 is mutually exclusive of the steps 602 and 604. At step 602, the network device may update the GLOB-SEL-PER-REC-TABLE with one or more global selective perception records based on the relevant entries in the GCE-REC-TABLE associated with the exception-perception data category. The GLOB-SEL-PER-REC-TABLE includes selective perception information associated with each of the plurality of communication entities. At step 604, the network device may revise criticality level associated with the selective perception information based on information in the GLOB-SEL-PER-REC-TABLE, when one or more exception thresholds are crossed.

In an embodiment, PER-PROC-MOD 208 processes the information in the exception feed (EXC-FEED) to create or update the selective perception information for the CRE using steps given below using the information in the relevant entries (if present) in the GCE-REC-TABLE associated with the exception perception data category.

First, criticality level is determined. To this end, the criticality level (EXC-CRT-LVL) of the exception based on exception type and exception details, using the EXC-CRT-MAPPING-TABLE is determined. Using exception type, exception details, number of occurrences of the same exception (type as well as the specific exception) during the session (or) within a pre-defined time window, a check is performed to determine if any exception thresholds (EXC-THRES) have been crossed. If one or more EXC-THRES have been crossed, the criticality level of the exception is increased.

Second, recommended privacy or security level and recommended privacy or security compliance level is determined. When the exception is privacy or security related, then based on exception details and past exceptions encountered during the session, the recommended privacy level (REC-PRIV-LVL-CRE) and the recommended security level (REC-SEC-LVL-CRE) using the REC-PRIV-LVL-TABLE and the REC-SEC-LVL-TABLE respectively are determined. Based on learning from past sessions involving the CRE (by examining past exception trends and privacy-security levels), and the trend of exceptions (type and number) until now in the present session, the REC-PRIV-LVL-CRE and REC-SEC-LVL-CRE are adapted. Additionally, based on the learning, PER-PROC-MOD 208 may also adapt the entries in REC-PRIV-LVL-TABLE and REC-SEC-LVL-TABLE for future use.

Further, based on exception details and past exceptions encountered during the session, the recommended privacy compliance level (REC-PRIV-COMPL-LVL-CRE) and the recommended security compliance level (REC-SEC-COMPL-LVL-CRE) using the REC-PRIV-COMPL-LVL-TABLE and the REC-SEC-COMPL-LVL-TABLE respectively are determined. Based on learning from past sessions involving the CRE (by examining past exception trends and privacy-security levels), and the trend of exceptions (type and number) until now in the present session, the REC-PRIV-COMPL-LVL-CRE and REC-SEC-COMPL-LVL-CRE are determined. Based on the learning, PER-PROC-MOD. 208 may also adapt the entries in REC-PRIV-COMPL-LVL-TABLE and REC-SEC-COMPL-LVL-TABLE for future use.

Third, recommended need fulfillment level is determined. Using exception type, number of occurrences of the exception type in the session till that instant, the recommended need fulfillment level (REC-NEED-FULFILL-LVL-CRE) using relevant information in the REC-NEED-FULFILL-LVL-TABLE is determined. In an exemplary embodiment, the following steps may be performed:

Based on exception type, the relevant entry (REC-NEED-FULFILL-LVL-TABLE-ENTRY) is fetched from REC-NEED-FULFILL-LVL-TABLE. Based on the number of occurrences of the exception type, the relevant NEED-FULFILL-FACTOR entry is fetched from NEED-FULFILL-FACTOR-TABLE. RAW-REC-NEED-FULFILL-LVL-CRE=(REC-NEED-FULFILL-LVL-ENTRY*NEED-FULFILL-FACTOR) is determined, REC-NEED-FULFILL-LVL-CRE=RAW-REC-NEED-FULFILL-LVL-CRE (AGGREG-NEED-FULFILL-REC-CRE*NEED-SCF) is also determined, where AGGREG-NEED-FULFILL-REC-CRE is fetched from the GLOB-COL-PER-REC-TABLE (if present, else value '0' is taken), and NEED-SCF is a configured (scaling) factor that determines the influence of past need fulfillment record of the CRE on the recommended need fulfillment level. In this case, the past need fulfillment record of the CRE is simply added (after multiplying by the NEED-SCF which is a scaling factor) to RAW-REC-NEED-FULFILL-LVL-CRE to determine REC-NEED-FULFILL-LVL-CRE. REC-NEED-FULFILL-LVL-CRE may also be computed using more complex means, for example, using a polynomial involving RAW-REC-NEED-FULFILL-LVL-CRE and AGGREG-NEED-FULFILL-REC-CRE. The REC-NEED-FULFILL-LVL-CRE may also be adapted based on the learning from past sessions. This is done by analyzing the trend of number of types of exceptions encountered in the current session and comparing it with trends in historical data involving the CRE (which is available in GCE-REC-TABLE), fetching the relevant EXP-NEED-FULFILL-REC-CRE values, and using them to adapt the REC-NEED-FULFILL-LVL-CRE, for example, using an additive factor such as a weighted average, or using complex polynomial factors.

Fourth, recommended reliability level is determined. The REC-REL-LVL-CRE of the CRE is determined based on the current exception, number and types of past exceptions during the session. In an exemplary embodiment, the following method may be used. For each exception, based on the type and criticality level (EXC-CRT-LVL) that occurred in the session, determine: REL-LVL=REL-VALUE*REL-FACTOR, where, REL-VALUE is fetched from the REL-VALUE-TABLE based on the exception type and criticality level and REL-FACTOR is fetched from the REL-FACTOR-TABLE. TOTAL-REL-LVL=Weighted average of individual REL-LVL determined above, wherein higher weights could be assigned to most recent exceptions and/or exceptions with higher criticality, etc. Then REC-REL-LVL-CRE is determined as REC-REL-LVL-CRE=TOTAL-REL-LEVEL AGGREG-REL-REC-CRE*REL-SCF, where, AGGREG-REL-REC-CRE is fetched from the GLOB-COL-PER-REC-TABLE (if present, else value '0' is taken), and REL-SCF is a configured factor that determines the influences of the past reliability record of the CRE on the recommended reliability level. In this case, the past reliability record of the CRE is simply added (after multiplying by the REL-SCF which is a scaling factor) to TOTAL-REL-LEVEL to determine REC-REL-LVL-CRE. REC-REL-LVL-CRE may also be computed using more complex means, for example, using a polynomial involving TOTAL-REL-LEVEL and AGGREG-REL-REC-CRE.

Fifth, overall recommendation for CRE is determined. This could be a weighted average of the recommended security and privacy levels of the CRE, recommended need fulfillment level, recommended security and privacy levels, recommended security and privacy compliance levels and recommended reliability level with greater weightage assigned to the factors associated with the exception currently received, and adjusted based on historical data when similar exceptions were encountered for the same class of CREs. It could also be determined based on more complex methods, for example, considering also the criticality of exceptions received, weightage based on the communication context. PER-PROC-MOD 208 then creates or updates the relevant entry in the GLOB-SEL-PER-REC-TABLE.

At step 606, processing the perception data comprises updating the GLOB-COL-PER-REC-TABLE with one or more global collective perception records based on the relevant entries in the GCE-REC-TABLE associated with the regular-perception data category. The GLOB-COL-PER-REC-TABLE includes collective perception information associated with each of the plurality of communication entities. In an embodiment, PER-PROC-MOD 208 processes the information in the PER-FEED to create or update the collective perception information for the CRE using the information received in the relevant entries in the GCE-REC-TABLE. In an exemplary embodiment, the following steps may be used. First, trustworthiness of the information is determined. The trustworthiness or accuracy factor (of the sender) of the information (SNDR-TRUST-FACTOR) may be determined simply as a factor corresponding to the PERC-SCORE of the sender, or using complex steps including computing the standard deviation (STD-DEV) of the inputs provided by the sender and the inputs provided by others for the same CRE, computing the PERC-SCORE of the sender for sessions with similar type of CREs (PERC-SCORE-SIMIL), and then computing TRUST-FACTOR by adjusting the PERC-SCORE-SIMIL by a factor corresponding to the STD-DEV.

Second usual security or privacy level of CRE are determined. The usual security level of the CRE (USU-SEC-LVL-CRE) may be determined as follows. New value of USU-SEC-LVL-CRE=TRUST-FACTOR*Weighted average of EXP-SEC-LVL-CRE fetched from the PER-FEED and 'n' entries of EXP-SEC-LVL-CRE for that CRE fetched from the GCE-REC-TABLE for last 'n' transactions or sessions 'n' is a provisioned parameter). Typically, higher weights will be assigned to more recent entries. Higher weights could also be assigned to those entries which have a higher weighted score of security-related exceptions (sum of security-related exceptions*criticality). The usual privacy level of the CRE (USU-PRIV-LVL-CRE) may be determined as follows: USU-PRIV-LVL-CRE=TRUST-FACTOR*Weighted average of EXP-PRIV-LVL-CRE fetched from the PER-FEED and 'n' values of ExP-PRIV-LVL-CRE for that CRE fetched from the GCE-REC-TABLE for last 'n' transactions or sessions. Typically, higher weights will be assigned to more recent entries. Higher weights could also be assigned to those entries which have a higher weighted score of privacy-related exceptions (where, weighted score of privacy-related exceptions=average (privacy-related exceptions*criticality)). Instead of weighted average method, more complex methods could also be used which take into consideration factors such as location, time of day, privacy level of the remote party involved in the communication session, etc.

Third, aggregated need fulfillment level of CRE is determined. In an exemplary embodiment, the aggregated need fulfillment level may be determined as: AGGREG-NEED-FULFILL-REC-CRE=TRUST-FACTOR*Weighted average of EXP-NEED-FULFILL-REC-CRE received in the PER-FEED and 'n' most recent values of ExP-NEED-FULFILL-REC-CRE fetched from the GCE-REC-TABLE. Higher weights could be assigned to more recent entries.

Fourth, aggregated security or privacy compliance level of CRE is determined. In an exemplary embodiment, the aggregated security compliance of the CRE may be determined as: WEIGHTED-SEC-EXCEP=Sum (security exception*criticality), where repeated occurrence of the same exception/exception type are counted separately to account for the multiple occurrences. SEC-COMPL-LVL-SESSION=SEC-COMPL-LVL corresponding to the WEIGHTED-SEC-EXCEP, obtained from the SEC-COMPL-LVL-TABLE. New value of AGGREG-SEC-COMPL-REC-CRE=Weighted average of (SEC-COMPL-LVL-SESSION and AGGREG-SEC-COMPL-REC-CRE*'n'), with a higher weightage assigned to SEC-COMPL-LVL-SESSION. Since this method involves considering all historic values of SEC-COMPL-REC-CRE, the SEC-COMPL-LVL-SESSION may be computed for the most recent 'n' sessions for the CRE and stored as a field in the GLOB-PER-REC, and each time a session is completed, the oldest SEC-COMPL-LVL-SESSION value is discarded, and the current SEC-COMPL-LVL-SESSION is included.

The aggregated privacy compliance of the CRE may be determined as: WEIGHTED-PRIV-EXCEP=Sum (privacy exception*criticality), where repeated occurrence of the same exception/exception type are counted separately to account for the multiple occurrence. PRIV-COMPL-LVL-SESSION=PRIV-COMPL-LVL corresponding to the WEIGHTED-PRIV-EXCEP, obtained from the PRIV-COMPL-LVL-TABLE. New value of AGGREG-PRIV-COMPL-REC-CRE=Weighted average of (PRIV-COMPL-LVL-SESSION and AGGREG-PRIV-COMPL-REC-CRE*'n'), with a higher weightage assigned to PRIV-COMPL-LVL-SESSION. Since this method involves considering all historic values of PRIV-COMPL-REC-GRE, the PRIV-COMPL-LVL-SESSION may be computed for the most recent 'n' sessions for the CRE and stored as a field in the GLOB-PER-REC, and each time a session is completed, the oldest PRIV-COMPL-LVL-SESSION value is discarded, and the current PRIV-COMPL-LVL-SESSION is included.

Fifth, aggregated reliability score of the CRE is determined. In an exemplary embodiment, the aggregated reliability score of the CRE (AGGREG-REL REC-CRE) may be determined as an average of the newly computed AGGREG-NEED-FULFILL-REC-CRE, AGGREG-SEC-COMPL-REC-CRE and AGGREG-PRIV-COMPL-REC-CRE. It may also be determined using more complex methods such as taking a weighted average of these three factors, with the weights being determined based on the security and privacy exceptions attributable to the CRE, number and criticality of exceptions related to need fulfillment, etc.

Sixth, the overall perception score is determined. In an exemplary embodiment, the overall perception score may be determined as: OVERALL-EXC-FACTOR=exceptions attributable to the CRE during the session (i.e., reason for the exception is CRE, and not the network, interference, external agents, etc.)*criticality*REL-FACTOR, where, REL-FACTOR is determined from REL-FACTOR-TABLE based on the exception type (for example, security, privacy, need-fulfillment related exceptions could correspond a higher factor). New PERC-SCORE=Weighted average of current PERC-SCORE and OVERALL-EXC-FACTOR, with a higher weightage assigned to the OVERALL-EXC-FACTOR. PER-PROC-MOD 208 then creates or updates the GLOB-COL-PER-REC entry in the GLOB-COL-PER-REC-TABLE with the values as computed above.

Seventh, new delivery schedule is determined. In an embodiment, PER-PROC-MOD 208 may also increment the number of perception entries to be distributed (NBR-ENTR-DIST) in the next time-bound cycle by a value equal to the number of IoTNs to which the update in the GLOB-COL-PER-REC-TABLE has to be communicated (by checking the IoTNs who communicated with the CRE, say, during last 15 days). If NBR-ENTR-DIST is greater than a certain threshold (NBR-ENTR-DIST-THRES), PER-PROC-MOD 208 may modify the time at which the next time-bound schedule of delivery of perception info is to happen. The following equation may be used: NEW-DELIV-SCHED=CURR-DELIV-SCHED−(NBR-ENTR-DIST-NBR-ENTR-DIST-THRES)*DELIV-SCF), where NEW-DELIV-SCHED=newly determined delivery schedule, CURR-DELIV-SCHED=current delivery schedule, DELIV-SCF=scaling factor for adapting the delivery schedule (provisioned value).

It will be appreciated that, for clarity purposes, the above described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments describe method and device for provisioning collective perception in communication networks. The method facilitates global collective perception refinement and maintenance. The method enables assimilation of collected experience and exceptions from different member communication network into global perception, based on type of communicating entities and nature of communication and communication environment, along with associated exceptions (security/privacy or any other) to form the collective perception. Additionally, the method enables effective distribution of global perception (usual, need-based, exceptions: push-pull).

The specification has described method and device for provisioning collective perception in communication networks. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, cloud, virtual storage, nonvolatile memory, hard drives, CD ROMs, DVDs, flash drives, disks, and any other known physical storage media.

The methods described may also be practiced in a distributed computing environment where functions are performed by remote processing devices that are linked through a communication network. In a distributed computing environment, computer executable instructions may be located in both local and remote computer storage media, including memory storage devices.

It is intended that the disclosure and examples be considered as exemplary only, with a true scope and spirit of disclosed embodiments being indicated by the following claims.

What is claimed is:

1. A method of provisioning collective perception in a communication network, the method comprising:
   receiving, by a network device, a perception data from a plurality of communication entities in the communication network upon satisfaction of at least one of predefined criteria;
   assimilating, by the network device, the perception data in a global collective experience record table in response to receiving the perception data from the plurality of communication entities, based on at least one perception data category associated with the predefined criteria;
   processing, by the network device, the perception data associated with each of the at least one perception data category to create composite perception information for each of the at least one perception data category based on entries in the global collective experience record table, wherein the perception data is processed based on an associated perception data category;
   determining, by the network device, perception distribution information to be shared with at least one communication entity from the plurality of communication entities, based on the composite perception information created for each of the at least one perception data category, wherein the perception distribution information is determined based on a request received for the perception data, a predefined trigger event and expiry of a predefined time period; and
   transmitting, by the network device, the perception distribution information to the at least one communication entity, in response to determining, wherein assimilating comprises ascertaining, by the network device, the at least one perception data category relevant for the perception data received from the plurality of communication entities, and
   ascertaining comprises at least one of:
   creating, in the global collective experience record table, a new data entry for at least one of the plurality of communication entities for a communication session;
   adding relevant perception data associated with a communication entity from the plurality of communication entities, to an existing data entry for the communication entity in the global collective experience record table for a communication session; and
   deleting an obsolete data entry associated with a communication entity from the plurality of communication entities from the global collective experience record table.

2. The method of claim 1, further comprising:
   receiving, by the network device, the request for the perception data from one of the plurality of communication entities, wherein the request is sent on initiation of a communication session or in response to a change in status of the communication session; and processing, by the network device, the request for the perception data to extract information from the request.

3. The method of claim 2, wherein the change in status comprises at least one of a change of context, a change in need and a change in purpose associated with the communication session.

4. The method of claim 1, wherein the predefined criteria comprise at least one of:
occurrence of an exception during a communication session in the communication network;
partial completion of the communication session; and
completion of the communication session.

5. The method of claim 1, wherein the at least one perception data category comprises an exception-perception data category and a regular-perception data category.

6. The method of claim 5, wherein processing the perception data comprises:
updating global selective perception record table with one or more global selective perception records based on the information associated with the exception-perception data category, wherein each of the one or more global selective perception records comprise selective perception information associated with each of the plurality of communication entities, and wherein for a communication entity, the selective perception information comprises at least one of Identifier (ID), group ID, class, security level, privacy level, aggregated fulfillment record, aggregated security compliance record, aggregated privacy compliance record, aggregated reliability record, or overall perception score; and
revising criticality level associated with the selective perception information based on the global selective perception table, when at least one exception threshold is crossed.

7. The method of claim 5, wherein processing the perception data comprises updating a global collective perception record table with one or more global collective perception records based on the information associated with the regular-perception data category, wherein each of the one or more global collective perception records comprises collective perception information associated with each of the plurality of communication entities, wherein for a communication entity, the collective perception information comprises at least one of: Identifier (ID), group ID, class, exception criticality level, recommended security level, recommended privacy compliance level, recommended fulfillment level, recommended compliance level, recommended privacy compliance level, recommended reliability level, or overall recommendation.

8. The method of claim 1, wherein the perception data is associated with each of the at least one perception data category processed periodically after predefined time period or in response to a predefined trigger event.

9. The method of claim 8, wherein the plurality of communication entities comprises at least one of an IoT network, an IoT device, an IoT Gateway (GW), or an Inter Connect GW (ICGW).

10. The method of claim 1, wherein the communication network is an Internet Of Things Network (IoTN).

11. The method of claim 1, further comprising adapting the perception distribution information and a plurality of network parameters based on learning from historical data.

12. A network device for provisioning collective perception in a communication network, the network device comprising:

a processor; and
a memory storing processor instructions that, when executed by the processor, cause the processor to:
receive a perception data from a plurality of communication entities in the communication network upon satisfaction of at least one of predefined criteria;
assimilate the perception data in a global collective experience record table in response to receiving the perception data from the plurality of communication entities, based on at least one perception data category associated with the predefined criteria;
process the perception data associated with each of the at least one perception data category to create composite perception information for each of the at least one perception data category based on entries in the global collective experience record table, wherein the perception data is processed based on an associated perception data category;
determine perception distribution information to be shared with at least one communication entity from the plurality of communication entities, based on the composite perception information created for each of the at least one perception data category, wherein the perception distribution information is determined based on a request received for the perception data, a predefined trigger event and expiry of a predefined time period; and
transmit the perception distribution information to the at least one communication entity, in response to determining, wherein
to assimilate the processor instructions further cause the processor to ascertain the at least one perception data category relevant for the perception data received from the plurality of communication entities, and
to ascertain the processor instructions further cause the processor to perform at least one of:
create, in the global collective experience record table, a new data entry for at least one of the plurality of communication entities for a communication session;
add relevant perception data associated with a communication entity from the plurality of communication entities, to an existing data entry for the communication entity in the global collective experience record table for a communication session; and
delete an obsolete data entry associated with a communication entity from the plurality of communication entities from the global collective experience record table.

13. The network device of claim 12, wherein the processor instructions further cause the processor to:
receive the request for the perception data from one of the plurality of communication entities, wherein the request is sent on initiation of a communication session or in response to a change in status of the communication session; and
process the request for the perception data to extract information from the request.

14. The network device of claim 12, wherein the predefined criteria comprise at least one of:
occurrence of an exception during a communication session in the communication network;
partial completion of the communication session; and
completion of the communication session.

15. The network device of claim 12, wherein the at least one perception data category comprises an exception-perception data category and a regular-perception data category.

16. The network device of claim 15, wherein to process the perception data, the processor instructions further cause the processor to:
- update a global selective perception record table with one or more global selective perception records based on the information associated with the exception-perception data category, wherein each of the one or more global selective perception records comprise selective perception information within the composite perception information associated with each of the plurality of communication entities, and wherein for a communication entity, the selective perception information comprises at least one of Identifier (ID), group ID, class, security level, privacy level, aggregated fulfillment record, aggregated security compliance record, aggregated privacy compliance record, aggregated reliability record, or overall perception score; and
- revise criticality level associated with the selective perception information based on the global selective perception table, when at least one exception threshold is crossed.

17. The network device of claim 15, wherein to process the perception data, the processor instructions further cause the processor to update a global collective perception record table with one or more global collective perception records based on the information associated with the regular-perception data category, wherein each of the one or more global collective perception records comprises collective perception information associated with each of the plurality of communication entities, wherein for a communication entity, the collective perception information comprises at least one of: Identifier (ID), group ID, class, exception criticality level, recommended security level, recommended privacy compliance level, recommended fulfillment level, recommended compliance level, recommended privacy compliance level, recommended reliability level, or overall recommendation.

18. The network device of claim 12, wherein the processor instructions further cause the processor to adapt the perception distribution information and a plurality of network parameters based on learning from historical data.

* * * * *